United States Patent
Odijk et al.

(10) Patent No.: US 7,707,109 B2
(45) Date of Patent: Apr. 27, 2010

(54) SERVICE PROVIDER ARCHITECTURE AND METHOD FOR DELIVERING CONTENT SERVICES TO MOBILE COMMUNICATION CUSTOMERS

(75) Inventors: Jacobus Johannes Maria Odijk, Alkmaar (NL); Hans Frederik Oortmarssen, The Hague (NL); Jan Ten Hoopen, The Hague (NL); Willem Jacques Alexander Moermans, The Hague (NL)

(73) Assignee: Koninklijke KPN N.V., The Hague (NL)

( * ) Notice: Subject to any disclaimer, the term of this patent is extended or adjusted under 35 U.S.C. 154(b) by 1504 days.

(21) Appl. No.: 10/119,381

(22) Filed: Apr. 9, 2002

(65) Prior Publication Data
US 2002/0156732 A1    Oct. 24, 2002

Related U.S. Application Data

(60) Provisional application No. 60/297,078, filed on Jun. 8, 2001.

(30) Foreign Application Priority Data

| Apr. 23, 2001 | (EP) | ................... 01201460 |
| Nov. 13, 2001 | (EP) | ................... 01204327 |

(51) Int. Cl.
*G06Q 40/00*    (2006.01)
(52) U.S. Cl. ......................................... 705/40
(58) Field of Classification Search ................... 705/40
See application file for complete search history.

(56) References Cited

U.S. PATENT DOCUMENTS

| 5,960,416 | A  | * | 9/1999  | Block ........................... 705/34   |
| 6,282,276 | B1 | * | 8/2001  | Felger .................... 379/114.19     |
| 6,332,579 | B1 | * | 12/2001 | Ritter .......................... 235/492  |
| 6,377,938 | B1 | * | 4/2002  | Block et al. .................... 705/32   |
| 6,463,275 | B1 | * | 10/2002 | Deakin ........................ 455/406    |
| 6,496,690 | B1 | * | 12/2002 | Cobo et al. .................. 455/408     |
| 6,543,686 | B1 | * | 4/2003  | Ritter .......................... 235/380  |
| 6,694,000 | B2 | * | 2/2004  | Ung et al. ................. 379/114.2     |
| 6,785,534 | B2 | * | 8/2004  | Ung ............................ 455/406   |
| 6,801,763 | B2 | * | 10/2004 | Elsey et al. .............. 455/404.1      |
| 6,829,474 | B1 | * | 12/2004 | Adachi .................... 455/414.1      |
| 6,888,929 | B1 | * | 5/2005  | Saylor et al. ............. 379/88.16      |

(Continued)

FOREIGN PATENT DOCUMENTS

WO     WO 98/21874     5/1998

(Continued)

OTHER PUBLICATIONS

"Executive Summary", WAP White Paper, © 1999, AU-System Radio, http://www.wapguide.com/wapguide/auwap.pdf, pp. 1-22.

*Primary Examiner*—Jagdish N Patel
*Assistant Examiner*—Sara Chandler
(74) *Attorney, Agent, or Firm*—Michaelson & Associates; Peter L. Michaelson

(57) ABSTRACT

A service mediator system implementable in a computer environment and which delivers services to a customer of a company having at least two types of customers with different billing data. The system additionally delivers the services only after verifying appropriate customer billing data.

15 Claims, 5 Drawing Sheets

U.S. PATENT DOCUMENTS

| | | |
|---|---|---|
| 7,103,066 B2 * | 9/2006 | Roy .......................... 370/466 |
| 7,164,927 B1 * | 1/2007 | Koch et al. ................. 455/466 |
| 7,194,432 B1 * | 3/2007 | Ritter et al. ................. 705/34 |
| 2002/0091601 A1 * | 7/2002 | Fellingham et al. ........... 705/34 |
| 2002/0120564 A1 * | 8/2002 | Strietzel ..................... 705/40 |
| 2002/0133457 A1 * | 9/2002 | Gerlach et al. ............... 705/39 |
| 2003/0069816 A1 * | 4/2003 | Ung et al. ................... 705/34 |
| 2003/0069840 A1 * | 4/2003 | Ung .......................... 705/39 |

FOREIGN PATENT DOCUMENTS

| WO | WO 99/31610 | 6/1999 |
|---|---|---|

* cited by examiner

SERVICE PROVIDER ARCHITECTURE AND METHOD FOR DELIVERING CONTENT SERVICES TO MOBILE COMMUNICATION CUSTOMERS

FIELD OF THE INVENTION

The present invention is related to billing systems for billing customers, in particular prepay customers for mobile/cellular telecom services.

STATE OF THE ART

With the existing emerging new services such as Web originated SMS, WAP services and m-commerce, all accessed using cellular phones, billing of services becomes more and more complex. Further, a lot of services are only available to so-called postpaid customers, i.e. subscription customers, and tariffs for a specific service may be subscription-specific (e.g. free for high-end subscribers, paying for low-end subscribers). This usually leads to development of a different architecture per service to cope with these differences, as the content provider usually is not aware of the customer's privileges.

New ways of paying for products and services via mobile telecommunication means are currently being introduced. Products include for example drinks obtainable from a distributor in a public place, while services can be, e.g., parking spaces or movie tickets. Also, so-called mobile banking will be available soon. These systems rely on a subscriber account, which can be used to pay for products and/or services by using a cellular phone. The prior art document WO98/21874 describes a system for revaluing, via a central network system, prepaid cards used by prepaid type customers of a mobile network. Such a prior art system is shown in the boxes 35,37 in FIG. 4, detailed in the sequel.

PROBLEM DEFINITION AND AIM OF THE INVENTION

Currently, there is no available architecture that can handle all these services, and there is no architecture available that enables all these services in a transparent way for post- and prepaid customers. Furthermore, it should also be possible to settle a balance which may be due by the content provider to the telecommunication service provider.

The present invention aims to provide an architecture for the service provider which realizes payments and billing of content provided to a customer, independent of the type of customer (postpaid or prepaid), the platform or the content itself.

SUMMARY OF THE INVENTION

In a first aspect of the present invention a service mediator system is disclosed, the service mediator system being implementable on a computer environment and being arranged for delivering services to a customer of a company having at least two types of customers with different billing data, said system further being arranged for delivering said services or confirming the service for delivery only after verification of the billing data. The services can optionally include the determination of the location of the customer. The determination of the location of a customer can also be done through an additional module that is connected to or part of the service mediator system and that is further linked to a communication system such as telecommunication system, for instance a GSM or GPRS or UMTS or any cellular network, or a GPS/GLONASS system. The services can be taken from or be provided by a third party and be forwarded by the system to said customer. Said system can bill the customer separately from delivering said services to said customer. The services can in such case be payment confirmation messages followed by the signalling of predetermined events such as goals in a soccer game.

In a preferred embodiment of this first aspect of the present invention, said services can be content data being delivered by a third party content provider and the company can be a mobile telecommunications operator company. In such case, or also in other cases, as an option, said content data can be selected depending upon the location of the customer. For example, a customer can request through his mobile terminal information about traffic or about a restaurant location in the same area (or even region) to a content services company. Through the location service of the mobile telecommunications operator, the location of the customer is forwarded to the content services company, and based on that location information, the content services company will forward the location or area or regional specific data, such as the specific location dependent traffic or restaurant information. Content data such as location data can also be sent from the customer to the third party content provider.

In a second aspect of the present invention, a service mediator system is disclosed, the system being implementable on a computer environment and being arranged for receiving via mobile communication techniques content from a content provider and being addressed to a customer, the system being arranged for verifying the customer's billing data, and for forwarding or confirming to the content provider the approval for delivery or refusing a transaction of the content to the customer based on the customer's billing data.

According to the first and second and further aspects of the present invention, the customer's billing data comprise data about the type of customer (prepaid or postpaid), and/or data about the account of said customer, and/or data about the subscriber account of said customer. The content service can be any kind of existing or future service that can be obtained with a mobile telephone. Preferably, the services are different from revaluing the amount on a prepaid card used by a customer for accessing a mobile network via a mobile telephone. This includes SMS, Web-originated SMS, WAP, i-Mode, banking services, credit services, on-site payment for services (e.g. parking lot) or products (e.g. drinks dispenser). The content service furthermore can include information about the weather forecast, traffic information, horoscope predictions, sweepstake information, flight information, financial and exchanges information, cultural and social events, nightlife in a city, etc. The service provider system of the invention can be used for any mobile communications technology such as UMTS, GSM, WAP, I-Mode GPRS, or any future mobile communications technology, and making use of any protocol such as XML or mobile html or UCP or other protocols. The content can be requested by the customer from the telecom service provider, possibly via the service mediator system, or can be requested by the customer directly from the content provider, possibly via the telecommunications network of the telecom service provider. The content can also be delivered by the content provider to the customer without a request of the customer or can be delivered on a regular basis based on a first request for content from the customer.

In a third aspect of the present invention, a service provider system for providing content services to a mobile communications customer is disclosed, said system comprising:

a telecom services provider system wherein or wherethrough a link is provided to a content provider system, and a service mediator system, and wherein said service mediator system is arranged to receive said content from said content provider, allow or refuse or confirm the transaction to the customer based on the customer's billing data, and optionally, in case of allowance, provide said content service to the customer, and optionally bill said customer for the content.

The content service can be any kind of existing or future service that can be obtained with a mobile telephone. This includes SMS, Web-originated SMS, WAP, i-Mode, banking services, credit services, on-site payment for services (e.g. parking lot) or products (e.g. drinks dispenser). The content service furthermore can include information about the weather forecast, traffic information, horoscope predictions, sweepstake information, flight information, financial and exchanges information, cultural and social events, nightlife in a city, etc. The service provider system of the invention can be used for any mobile communications technology such as UMTS, GSM, WAP, i-Mode, GPRS, or any other and/or future mobile communications technology, and making use of any protocol such as XML or mobile html or UCP or other protocols.

The content can be requested by the customer from the telecom service provider, possibly via the service mediator system (SMS or web based), or preferably can be requested by the customer directly from the content providers, possibly via the telecommunications network of the telecom service provider. The content can also be delivered by the content provider to the customer without a request of the customer or can be delivered on a regular basis based on a first request for content from the customer (push messages).

Preferably, the system according to this third aspect of the present invention is at least partly implemented on a computer environment.

The service provider system according to this third aspect of the present invention can be further arranged in that said service mediator comprises a payment/billing server arranged to perform validation of the customer's request and payment and/or billing for the content service. This payment/billing server is preferably a database, comprising customer data such as type of customer: (postpaid or prepaid); subscriber accounts: billing information (for postpaid customers) and prepaid account information (for prepaid customers). Thus the term billing data is to be understood as comprising data about the type of customer (postpaid or prepaid)and about the actual prepaid balance or the account information of the customer.

In a fourth aspect of the present invention, a method for providing content services to a mobile communications customer is disclosed, said method comprising the following steps:

receiving a customer request for a content service by a content provider, optionally comprising the step of receiving the customer request for the content service by a mediator and transferring it to the content provider, delivering the content service to a service mediator, the service mediator optionally being the same as the mediator, wherein said service mediator performs the following steps:

allowing or refusing of the transaction to the customer based on the customer's billing data, in case of allowance, providing said content service to the customer or confirming to the content provider approval for delivery to the customer, and optionally billing the customer and/or content provider for the content.

The method can be further characterised in that the customer's billing data comprises data about the type of customer (prepaid or postpaid), data about the account of the customer, and optionally data about the subscriber account of the customer.

In case the customer is a prepaid customer, said step of billing the customer can comprise withdrawal of the required sum from the customer's account.

The customer can also be a postpaid customer. The method of the present invention can be further characterised in that the step of billing the customer comprises withdrawal of the required sum from an m-commerce account.

In a preferred embodiment, the method further comprises the step of billing the customer for the transport of the content.

The present invention thus provides a reliable and economically efficient method and system for delivering content services to mobile subscribers. The mobile subscribers may be both prepaid and postpaid subscribers. Also, using the present system and method, it is possible for a telecommunication service provider to settle balances due by the content provider, e.g. for using the service mediator functionality.

The different aspects and embodiments of the invention as described hereabove or in the detailed description can be combined according to the knowledge of the person of skill in the art as reading this patent text.

SHORT DESCRIPTION OF THE DRAWINGS

DETAILED DESCRIPTION OF THE INVENTION

For the purpose of teaching of the invention, preferred embodiments of the method and systems of the invention are described in the sequel. It will be apparent to the person skilled in the art that other alternative and equivalent embodiments of the invention can be conceived and reduced to practice without departing from the true spirit of the invention, the scope of the invention being limited only by the appended claims as finally granted.

EXAMPLE 1

Content Billing of SMS Via UCP

Figure 1:
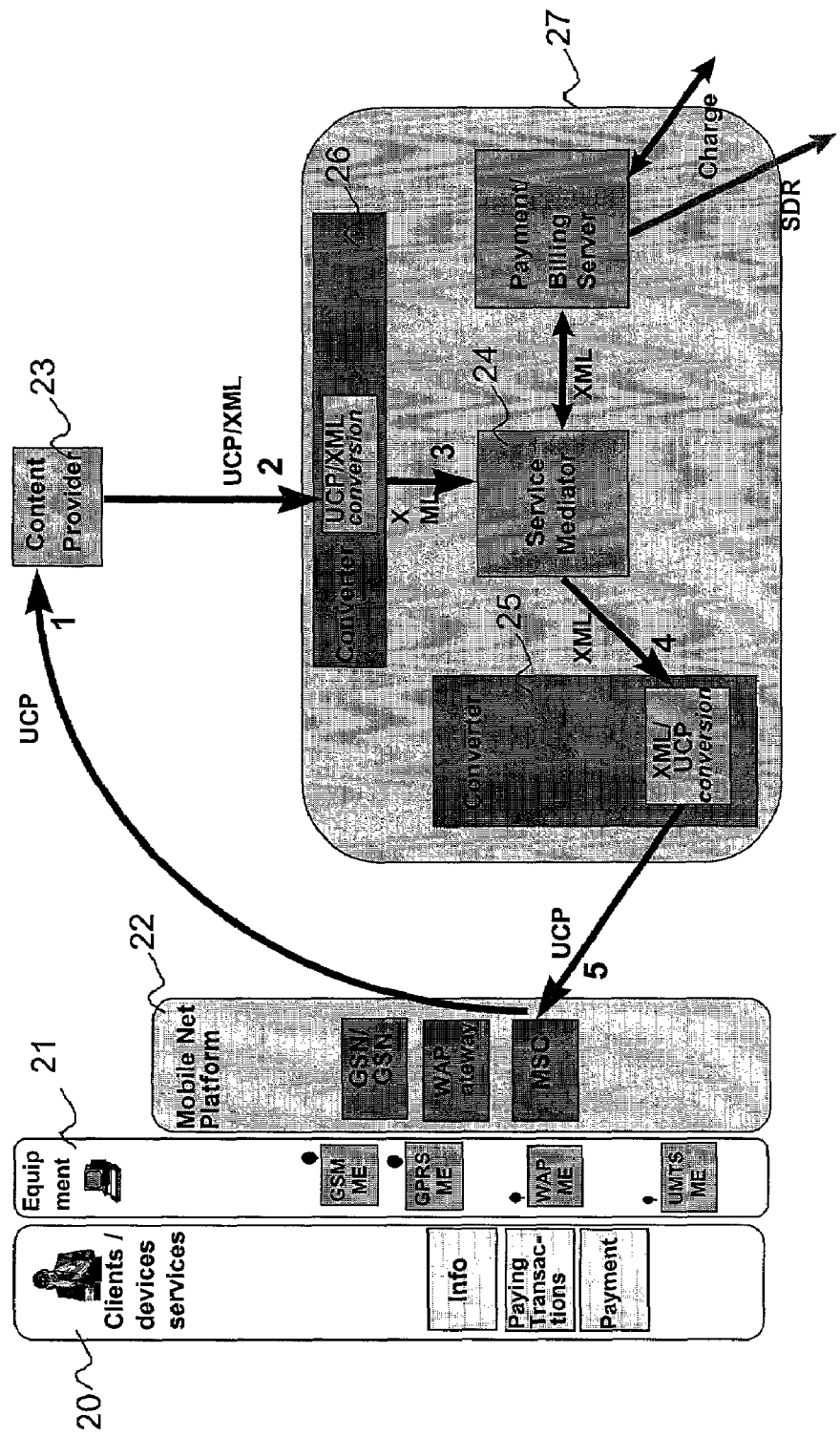
FIGS. 1 and 2 represent an example of a system according to the present invention and illustrate the method of the invention.

FIG. 1 describes the method of the present invention in the specific case of SMS billing. A customer 20 sends in a request for a content service, in this case an SMS message 1. This message is sent by the telecom service provider 22 to a content provider 23. This content provider 23 reacts to the message by sending the desired content to the service mediator 24 via message 2. The service mediator 24 will check whether the customer is entitled to the content service. If allowable, the content is sent to the customer using links 4,5. The Payment/Billing server 27 takes care of charging the customer's prepaid account, or sends an SDR (Service Detail Record) to the Telecom Service Provider's billing services to include the content service on the next bill for the postpaid customer. It is an option to include the converters 25, 26 which transform UCP messages to XML messages and vice versa into the service mediator module, as this allows for a unified standard language within the service mediator/payment/billing server module such as XML, and is also useful to deal with requests in different languages, as these requests will be translated by the converters 25, 26.

EXAMPLE 2

Content Billing of WAP

Figure 2:
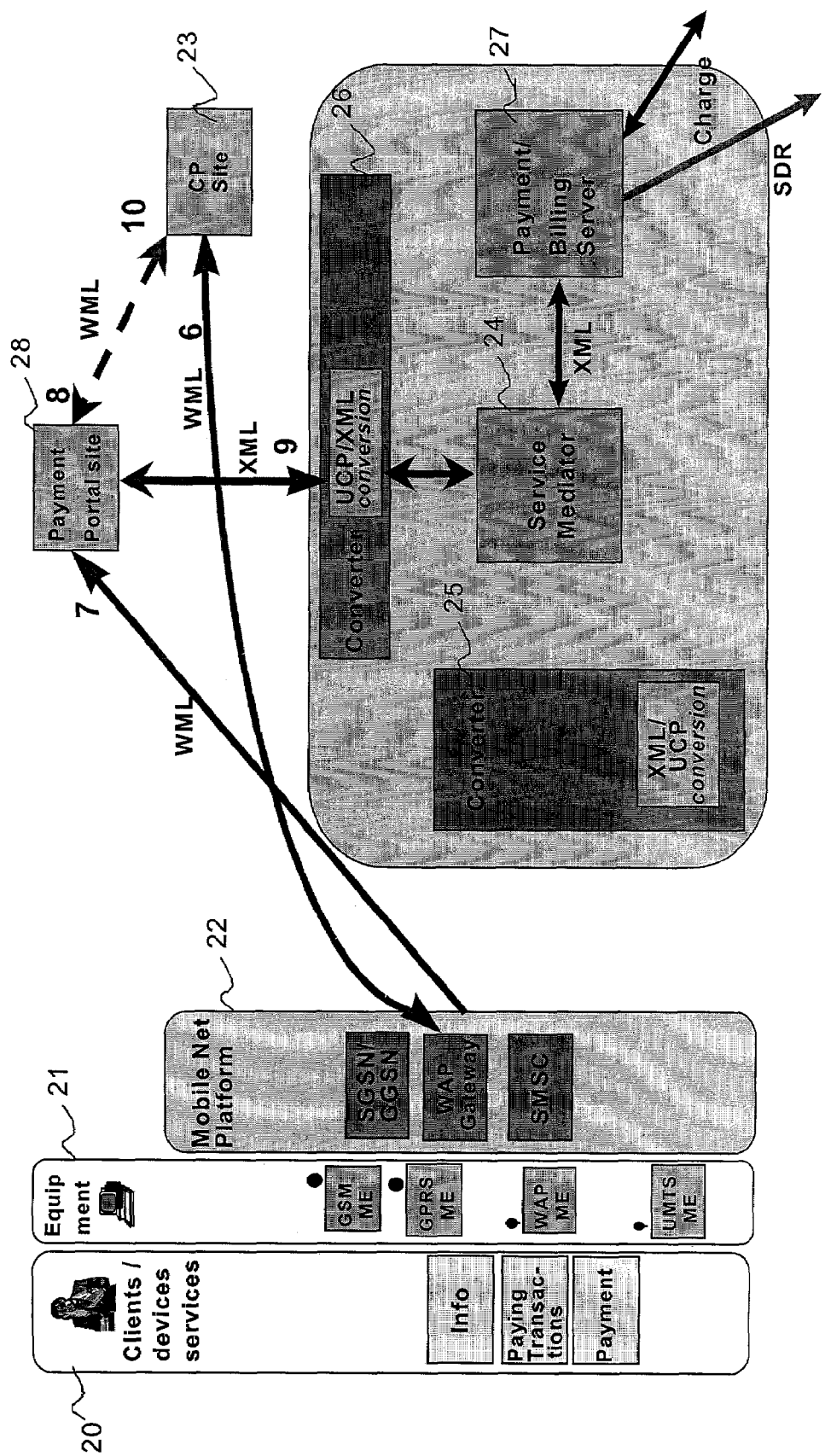

FIG. 2 describes the method of the present invention in the specific case of WAP services. Here again the request for a content service, a WAP request in this case, is sent to a content provider's site (CP Site) 23 via WML message link 6. These requests are direct and the customer 20 can select the information he needs by browsing the site of the content provider 23, or change content provider 23 when he does not find the information he needs. A request for a paying content service will transfer the customer 20 to a payment portal site 28 using WML message link 7. The payment portal site 28 receives data from the content provider 23 (e.g. amount, transaction identification number and content-provider code) via WML message link 8. The customer 20 will be authenticated at the payment portal site 28 and is requested to confirm the payment via link 7 or via another WML-link. When the customer agrees, the payment/billing server will be queried to check whether the customer is entitled to the service via XML link 9, converter 26 and XML link to the Service Mediator 24. If the answer is affirmative, the payment will be effected as described higher and the content provider 23 will receive a confirmation of the payment via WML message link 10. The customer will be redirected to the content provider's site to receive the requested content services via WML message link 6.

It is clear that the method and the system of the present invention can be easily adapted to other content services than those illustrated by the figures and examples. More particularly SMS, Web-originated SMS, UMTS, WAP, i-Mode banking services, credit services, on-site payment for services (e.g. parking lot) or products (e.g. drinks dispenser), . . . are easily implementable using a single architecture. Also subscriber accounts can be charged using the method of the invention, internal accounts (i.e. accounts that reside at the Telecom Service Provider) as well as external accounts (e.g. banks, credit card companies).

The Service Mediator 24 has as a goal to deal with providing the content service to the customer and with the payment issues. The Payment/billing server 27 allows to query customer data and effectuates the payment.

Preferably, the telecom transport costs for providing the service are billed separately. This can easily be implemented using a tariffing server. This is necessary because not all traffic generated by the content request will be normal traffic, billable by the telecom service provider but can be, e.g., internet traffic.

It is also possible to settle the costs for the content provider by the telecommunication provider (payment/billing server), possibly with inclusion of costs payable by the content provider to the telecommunication provider.

Figure 3:
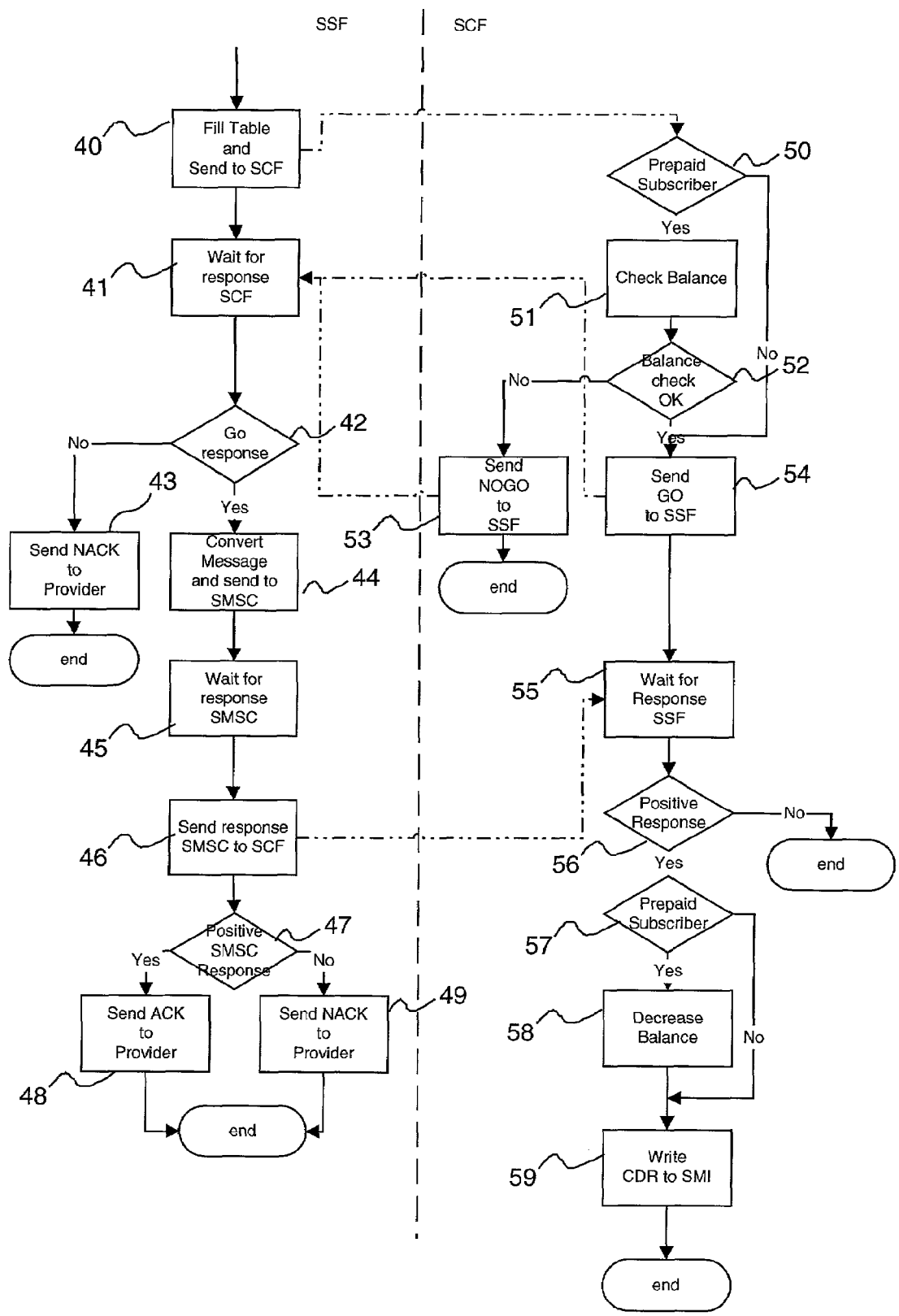
FIG. 3 shows a flow diagram of the present method.

FIG. 3 shows a flow diagram of an embodiment of the present method as implemented for delivery by the service mediator of SMS messages from a content provider 23. The flow can be divided in two interrelated parts, the Service Switching Function (SSF) and the Service Control Function (SCF). The SSF part receives a message of the provider at block 40 and searches for the data which are necessary to properly process the message in an administrative manner. These data are sent to the SCF. The Service Control Function first checks whether the customer is a prepaid subscriber at decision block 50. If the customer is a prepaid subscriber, the balance value is looked-up in block 51 and in decision block 52, it is checked whether the balance is sufficient. If a sufficient balance is present, a 'GO' message is sent to the SSF (block 54). If an insufficient balance is present, a 'NOGO' message is sent to the SSF (block 53) and the SCF flow is ended. In the meantime, the SSF function has waited for a response from the SCE in block 41. In decision block 42, the response is checked. When the response is negative (NOGO), a negative acknowledgement (NACK) is sent to the provider in block 43 and the flow of the SSF ends. When the response is positive (GO), the message is converted and sent to an SMS center (SMSc) in block 44. After that, the SSF function will wait for a response from the SMS center in block 45, and after receiving the response, this response of the SMS center is sent to the SCF in block 46. When the response from the SMS center is positive (check in decision block 47), a positive acknowledgement (ACK) is sent to the provider in block 48 after which the flow ends. When the response from the SMS center is negative (check in decision block 47), a negative acknowledgement (NACK) is sent to the provider in block 49 after which the flow ends. When the SCF receives the response of the SMS center (after waiting in block 55) it checks in decision block 56 whether the response is positive. If the response is negative, the flow of the SCF ends. If the response is positive, it is again checked in decision block 57 whether the customer is a prepaid customer. If this is the case, the balance is decreased with the proper amount in block 58. When the customer is a postpaid subscriber, the flow directly continues to block 59, in which a call detail record (CDR) is written to the SMI, after which the flow ends. Thus, the amount for the service will only be charged when the message transaction has actually taken place.

BEST MODE EMBODIMENT

Figure 4:
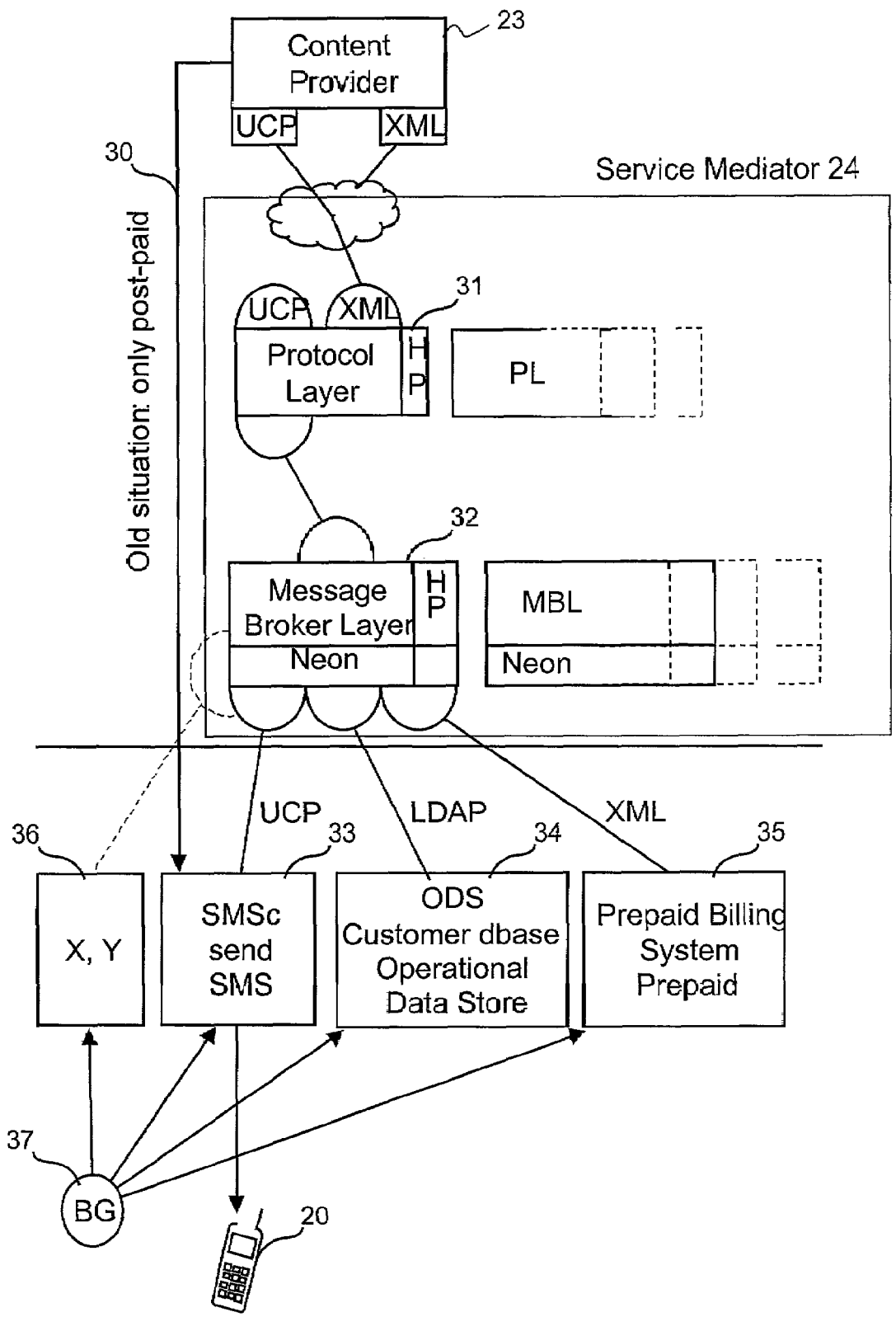
FIG. 4 shows a detailed architecture of the architecture of a service mediator system according to a best mode embodiment of the present invention.

In a best mode embodiment of the invention, as depicted in FIG. 4, a service mediator system that is implemented for a mobile telecommunications operator and that is on the basis of a Message Broker software module is described. In the existing situation, the content provider 23 communicates directly with the customer 20 via the SMS center (SMSc) 33, as indicated by arrow 30. The Message Broker can be any one of the commercially available message broker products of major software companies. An example can be the impact product of the company Sybase (NEON). The message broker is split in a protocol layer 31 and a message broker layer 32. The message broker layer 32 is connected to a SMSc module 33 and to the Operational Data Store of the customers database (ODS) 34, and to the Prepaid Billing System 35. The protocol layer 31 is arranged for communication with a content provider system 23 and can communicate therewith via a UCP or a XML protocol. The protocol layer 31 and message broker layer 32 can communicate among them via a fast internal protocol. The message broker layer 32 can communicate with the SMSc module 33 via UCP protocol and to the Operational Data Store of the customers database (ODS) 34 via LDAP (Lightweight Directory Access Protocol) protocol, and to the Prepaid Billing System 35 via a XML protocol. The message broker layer 32 can in a further embodiment also communicate with a location base server 36 using a suitable protocol. The SMS centre 33, the Operational Data Store of the customers database (ODS) 34, the prepaid billing system 35, and the location base server 36 can also communicate with a background server (BG) 37 of the telecommunication service provider. The background server 37 is arranged a.o. to control and update the other elements of the present system.

The service mediator 24 can check the status of the customer by querying the Operational Data Store 34. Using the MSISDN number of the customer 20 (country code, telecom provider code and serial number, e.g. 31653123456) as input, the Operational Data Store will respond with the status of the customer (prepaid, postpaid, none and blocked flags). When the Operational Data Store 34 responds with the status 'none', that particular customer is not a subscriber of the telecommunication provider operating the service mediator 24. It is also possible, that a known subscriber will be blocked from certain services for a number of reasons. This situation will be indicated by the Operational Data Store 34 using the blocked flags.

Figure 5:
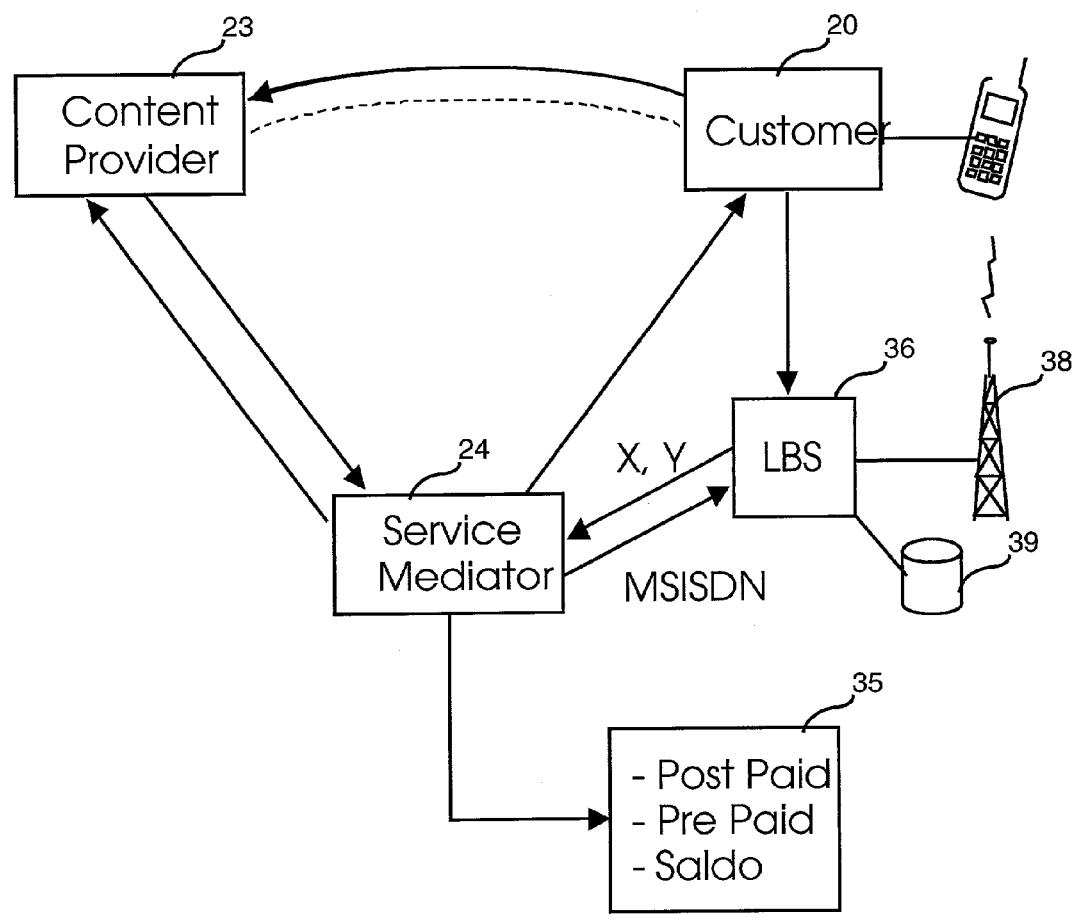
FIG. 5 shows a further embodiment of the present system, in which location information is used.

In FIG. 5, a schematic diagram is shown in which use can be made of location information of the customer for providing information by a content provider 23. A customer 20, using a cellular phone, contacts a content provider 23 to indicate that local information is needed. The content provider 23 forwards this request to the service mediator 24, as discussed earlier. The service mediator 24 may send a request for location information of a customer to a location base server 36, e.g., by using the MSISDN number of the customer as a reference. The location base server (LBS) 36 receives information on the present location of the customer 20, e.g., using information of the cellular network (transceivers 38, location database 39). Next, the service mediator 24 receives the co-ordinates (X,Y) of the associated customer and forwards this to the content provider 23. When it is checked that the content provider can supply proper local information, the content provider 23 will send the information to the service mediator 24 which will forward the content as described earlier to the customer 20. The service mediator 24 will send an acknowledgement to the content provider 23, if the customer could be billed.

The information provided by the content provider 23 may include information requested instantaneously by the customer 20, periodic information, such as traffic information, or event generated information, such as a stock value crossing a preset threshold.

As described with reference to FIG. 4, the service mediator 24 may provide a UCP, such as a UCP51, or XML interface for the content providers 23. Other messages will be replied to with an error message or ignored (unknown messages).

In a UCP51 type message, a tariff field may be included (preferably in the XSER field), which indicates the tariff the content provider 23 wants to charge for that specific service to the customer 20. The service mediator 24 will parse the received messages, by checking the type of message, the LEN field in the header and the checksum of the UCP message. After this, the service mediator 24 will remove the tariff field from the UCP message and send the UCP message onward (e.g. to the SMS center 33). In this way, the service mediator 24 is a transparent system for the content provider 23 with respect to UCP messages (with the exception of the tariff field.

The service mediator 24 will manage a provider profile file, in which it is indicated what actions are allowed for a specific content provider 23. This may relate to a specific interface which may be used by a specific content provider 23 (such as UCP, XML single destination or XML multiple destination), or to a specific function provided by the service mediator. The number of allowed functions for a content provider 23 may be equal to zero, thereby effectively blocking that content provider 23.

The service mediator is able to notify a subscriber (customer) when a message can not be delivered for some reason, such as insufficient funds in the prepaid account. Preferably, the text which is sent to the customer is dependent on the originating content provider. This function of the service mediator 24 can also be disabled for a specific content provider 23. In that case, it is assumed that the content provider 23 will itself inform the customer.

Also, in the provider profile, a maximum amount for a service can be set for each provider. When the service mediator 24 receives a message in which the tariff as indicated is higher than the maximum amount for that content provider, the service mediator 24 will not accept the message (and inform the sender of the message using an error code in the response message).

The service mediator 24 will also check the length of a message. In case of an alphanumeric message, the maximum number of characters in the message is 160. When it is larger, the message will not be accepted. Transparent messages are already limited to 140 characters and this will not conflict with further system requirements. For transparent messages, no check on length is necessary.

The throughput for each content provider 23 is measured by the service mediator 24. When a preset maximum is crossed for a certain content provider 23 (as stored in the provider profile) the throughput of that content provider will be limited by delaying the response to a message (ACK/NACK). The maximum throughput is defined as X messages in Y seconds.

In order to be able to control peak loads more efficiently, the service mediator 24 can define one or more time slots, in which a predetermined content provider 23 has access or no access to the system. This access time window function is relevant for a limited number of content providers 23 which have high throughput values. For 'small' content providers 23, this function is not relevant, and this can be indicated in the provider profile. The time window function can be implemented on the TCP/IP connection level. In that case, the service mediator 24 must be able to disconnect the TCP/IP connection to the specific content provider 23.

To be able to control the throughput of a content provider 23, it is also possible to set the maximum number of parallel connections for each content provider 23 in the provider profile. When a content provider 23 wants to open additional sessions, the service mediator 24 will ignore these messages and send an error code to the content provider 23.

The service mediator 24 will log various data concerning the processing of the transactions in log files. A number of generic requirements are set for the log files, i.e. starting time, maximum time that file is open, maximum size of the log file and manual closing of a log file to allow an operator to inspect the log file. As the service mediator 24 may be implemented in a parallel manner, i.e. a number of servers may run the service mediator functionality, the log files of each server may be copied periodically to a central logging server. It is also possible to post-process the log files, e.g. for data reduction or system analysis.

What is claimed is:

1. Apparatus for use in conjunction with a telecommunications network provided by a telecommunications service provider and implementable in a computer environment, the apparatus comprising:
a service mediator, being operated by the telecommunications service provider and connected to the network, for receiving, over the network, digital content to be rendered on a mobile terminal connected to the network, from a content provider connected to the network, wherein the mediator is adapted, in response to a request for the content issued by a requesting customer to the content provider and through the network, to determine whether the customer is entitled to receive the content based on subscription details of the customer and, when so entitled, to send the content over the network to the mobile terminal, wherein the mediator comprises:
means connected to or in the mediator for receiving the content, over the network, from the content provider;
means, responsive to the receiving means, for determining, once the content is received, and in conjunction with a payment/billings system, connected to the mediator, whether the customer is entitled to the content based on whether the customer is pre-paid or post-paid and whether, when the customer is pre-paid, a minimum sum then exists on deposit in an account associated with the customer;
means, responsive to the determining means and as a result of an indication, from the payment/billing system to the determining means, that the customer is entitled to the content for sending the content, via the service mediator of the telecommunications service provider and over the network, to the mobile terminal; and
means for billing, through the payment/billing system, the customer for the content sent to the mobile terminal.

2. The apparatus recited in claim 1 wherein the apparatus is arranged for sending said content to said customer when the customer is a postpaid customer or when the customer is a prepaid customer having a balance in the account which equals or exceeds a charge for the content.

3. The apparatus recited in claim 1 further comprising means for causing the payment/billing server to charge the account when the customer is prepaid or to send a service detail record to a billing service when the customer is post-paid.

4. The apparatus recited in claim 1 further comprising:
means for determining a location of said customer; and
means for selecting said content depending upon the location of said customer.

5. The apparatus recited in claim 1 wherein the customer is billed for the content separately from transport of the content to the customer.

6. The apparatus recited in claim 1 wherein the content receiving means receives said content via mobile communication techniques.

7. A service provider system for providing content services to a mobile communications customer, said system comprising:
a telecommunications system provided by a telecommunications service provider and having a telecommunications network wherein a content provider is connected to the network; and
a service mediator, being operated by the telecommunications service provider and connected to the network, for receiving, over the network, digital content to be rendered on a mobile terminal used by the mobile communications customer and connected to the network, from the content provider, wherein the mediator is adapted, in response to a request for the content issued by the customer to the content provider and through the network, to determine whether the customer is entitled to receive the content based on subscription details of the customer and, when so entitled, to send the content over the network to the mobile terminal, wherein the mediator comprises:
means connected to or in the mediator for receiving the content, over the network, from the content provider;
means, responsive to the receiving means, for determining, once the content is received, and in conjunction with a payment/billing system, connected to the mediator, whether the customer is entitled to the content based on whether the customer is pre-paid or post-paid and whether, when the customer is pre-paid, a minimum sum then exists on deposit in an account associated with the customer;
means, responsive to the determining means and as a result of an indication, from the payment/billing system to the determining means, that the customer is entitled to the content for sending the content, of the telecommunications service provider and over the network, to the mobile terminal; and
means for billing, through the payment/billing system, the customer for the content sent to the mobile terminal.

8. The service provider system recited in claim 7 wherein the service mediator is arranged to bill the customer for the content and for use of the telecommunications system.

9. The service provider system recited in claim 7 wherein at least a portion of the service provider system is implemented in a computer environment.

10. The service provider system recited in claim 7 wherein the payment/billing server performs validation of the request for the content from the customer, and payment or billing for the content sent to the customer.

11. The service provider system recited in claim 7 further comprising a module which determines a location of the customer, wherein the content is dependent on the location of the customer.

12. A method for use in conjunction with a telecommunications network provided by a telecommunications service provider and implementable in a computer environment, the environment having a service mediator, wherein the method comprises the steps performed in the mediator of:
receiving digital content, over the network and from a content provider connected to the network, to be rendered on a mobile terminal connected to the network,
determining in the service mediator, being operated by the telecommunications service provider and connected to the network, in response to a request for the content issued by a requesting customer to the content provider through the network, whether the customer is entitled to receive the content based on subscription details of the customer and, when so entitled, to send thereafter the content over the network to the mobile terminal;
determining, once the content is received, and in conjunction with a payment/billing system, connected to the mediator, whether the customer is entitled to the content based on whether the customer is pre-paid or post-paid and whether, when the customer is pre-paid, a minimum sum then exists on deposit in an account associated with the customer;

in response to the determining step and as a result of an indication, from the payment/billing system to the determining means, that the customer is entitled to the content, sending the content, via the mediator of the telecommunications service provider and over the network, to the mobile terminal; and billing, through the payment/billing system, the customer for the content sent to the mobile terminal.

13. The method recited in claim 12 further comprising the step of billing the customer or the content provider for transport of the content.

14. The method recited in claim 12 wherein, when the customer is postpaid, the billing step comprises the step of withdrawing a required sum for the content from the account.

15. The method recited in claim 12 wherein, when the customer is postpaid, the billing step comprises the step of sending a service detail record for the content to a billing service.

* * * * *